Oct. 22, 1963

F. C. COX 3,107,804

MOBILE BULK FEED BODY

Filed Nov. 8, 1960

INVENTOR
FRANCIS C. COX
BY
*Williamson + Palmatier*
ATTORNEYS

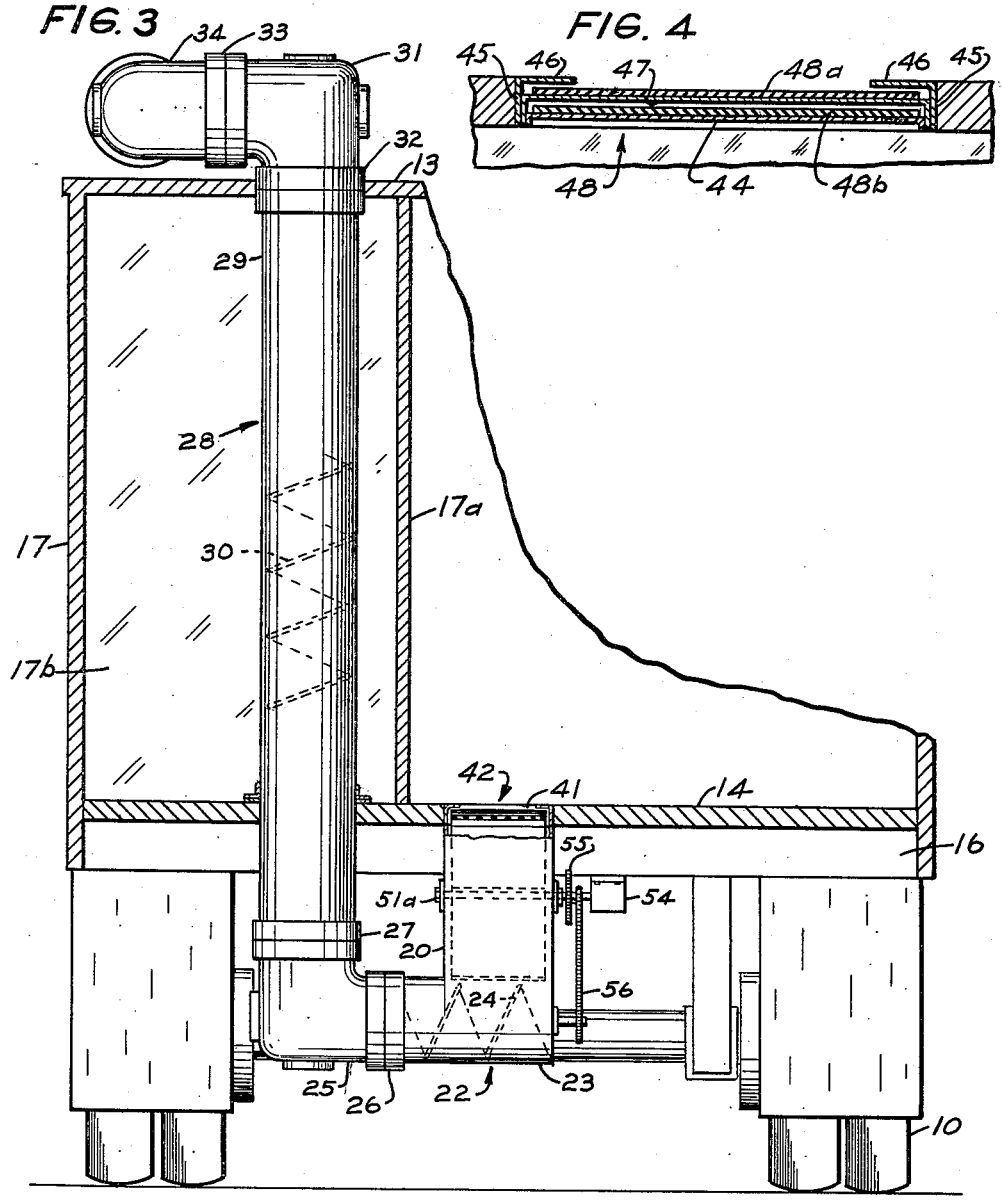

United States Patent Office 3,107,804
Patented Oct. 22, 1963

3,107,804
MOBILE BULK FEED BODY
Francis C. Cox, 474 W. 5th St., New Richmond, Wis.
Filed Nov. 8, 1960, Ser. No. 68,032
4 Claims. (Cl. 214—522)

This invention relates to feed body structures and more particularly to mobile feed body structures having conveyer mechanism incorporated therein for use in facilitating unloading of the feed body.

An object of this invention is to provide a novel mobile feed body, of simple and inexpensive construction for use in transporting bulk material and including conveyer mechanism positioned slightly below the bottom wall of the feed body and extending substantially the entire length thereof for use in rapidly and efficiently unloading the bulk material from the feed body.

Another object of this invention is to provide a novel and improved mobile feed body for use in transporting bulk material and the like and including a receptacle having a discharge channel at the rear portion thereof, and a conveyer mechanism extending substantially the full length of the receptacle and being disposed slightly below the receptacle bottom so that bulk material may be continuously and efficiently fed through the discharge channel.

A more specific object of this invention is to provide a novel and improved feed body for use in transporting bulk material and the like and including a receptacle having an inlet type apron conveyer mechanism positioned within a recess in the receptacle bottom and extending substantially throughout the length thereof, the apron conveyer mechanism being disposed slightly below the receptacle bottom and being of compact construction so that the capacity of the receptacle is in no way reduced but which permits rapid unloading of bulk material from the feed body.

These and other objects and advantages of my invention will more fully appear from the following description made in connection with the accompanying drawings wherein like character references refer to the same or similar parts throughout the several views and in which:

FIG. 3 is a view on an enlarged scale taken approximately along line 3—3 of FIG. 1 and looking in the direction of the arrows, certain portions thereof being broken away for clarity; and FIG. 4 is a cross sectional view on an enlarged scale taken approximately along line 4—4 of FIG. 2 and looking in the direction of the arrows.

Figure 2:
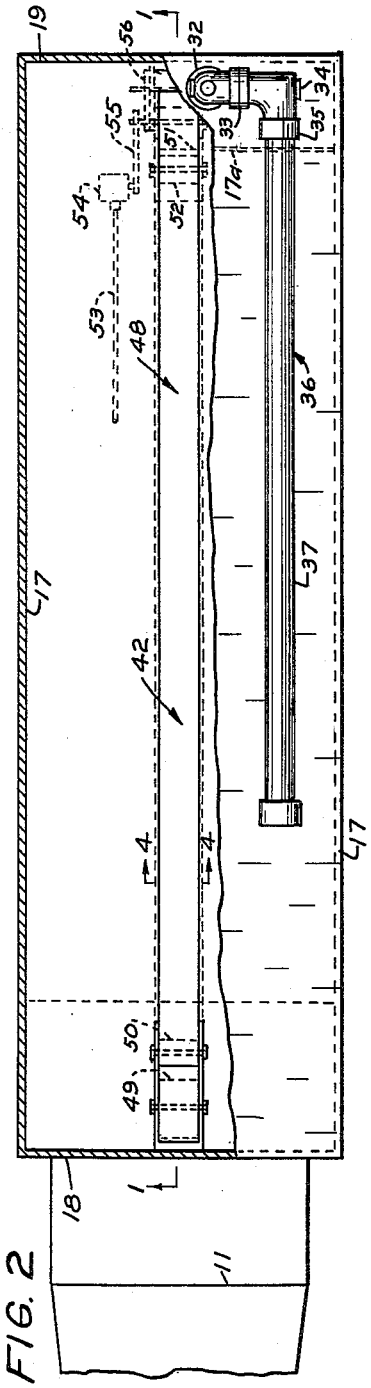
FIG. 2 is a top plan view of my invention with certain parts thereof broken away for clarity and with certain seal portions indicated by dotted line configuration.

Referring now to the drawings, it will be seen that one embodiment of my invention includes a feed body or elongate trailer designated in its entirety by the reference character T which is of the conventional tow type and which includes sets of duel rear wheels 10 and is adapted to be attached to a conventional prime mover or tractor 11 by means of a hitch mechanism 12 adjacent the front end of the trailer. The trailer will also be provided with rollers of the retractable type for use in supporting the trailer when the latter is disconnected from its prime mover.

Figure 1:
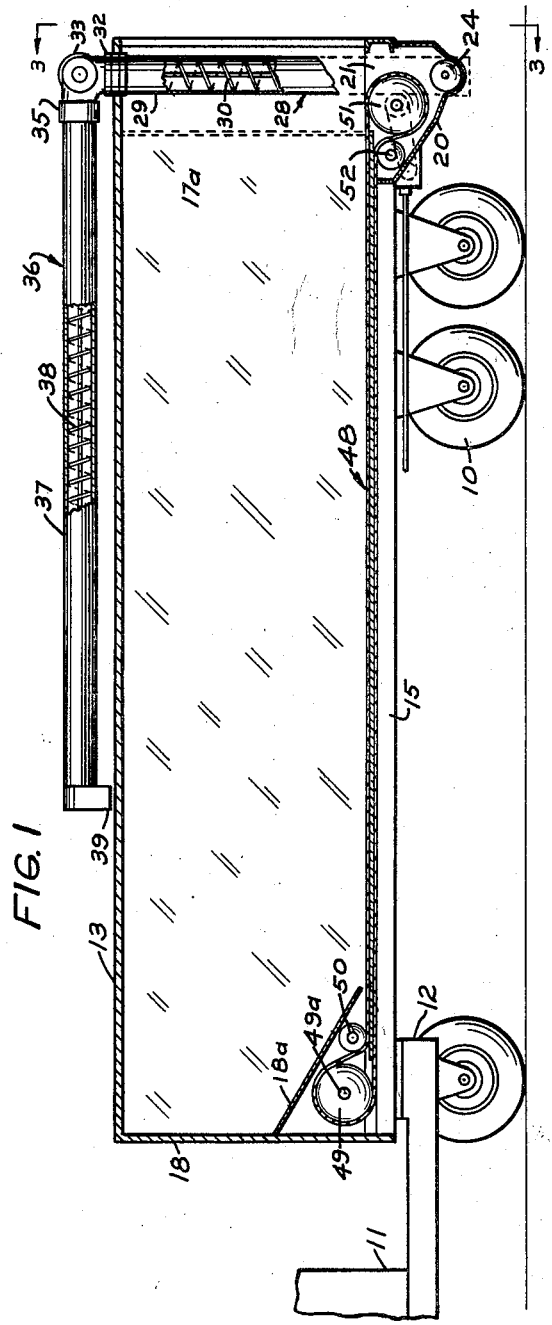
FIG. 1 is a longitudinal sectional view of my invention taken approximately along line 1—1 of FIG. 2 and looking in the direction of the arrows.

Referring now to FIG. 1 it will be seen that the feed body T is of elongate substantially rectangular configuration and is provided with a top wall 13 and a bottom wall 14, the latter being suitably supported upon a reinforcing support frame including longitudinal stringers or braces 15 and transverse stringers or braces 16. Actually, the feed body T comprises a receptacle having opposed side walls 17 and front walls 18 and rear walls 19 of such unique construction that it is especially adaptable for use in transporting bulk material such as grain or the like.

It will be noted that the feed body T is provided with a depending discharge chute 20 adjacent the rear portion thereof and this discharge chute opens upwardly through a feed outlet 21 into the interior of the feed body T. Referring now to FIG. 1, it will be noted that the discharge chute 20 is disposed in communicating relation adjacent its lower end with a transverse auger conveyer mechanism 22 which includes a tubular housing or channel 23 having an auger conveyer 24 disposed therein. Thus, it will be seen that bulk material unloaded through the feed outlet 21 into the discharge chute 20 will be conveyed laterally of the feed body for discharge therefrom.

To this end, it will be noted that the transverse auger conveyer mechanism 24 is interconnected by means of a head 25 to an elevator or vertical elevator conveyer mechanism 28 so that the material fed into the discharge tube 20 will be elevated for discharge into bins, hoppers or the like. The head 25 actually includes a sleeve type joint 26 connected to the tubular housing 23 and a sleeve type joint 27 which is interconnected to the tubular housing 29 of the vertical conveyer mechanism 28. An elongate auger conveyer 30 is rotatably positioned within the tubular housing 29 and cooperates with the auger 24 for elevating the bulk material for discharge from the feed body.

The uppermost end of the elevator mechanism 28 is provided with a head 31 which includes a sleeve joint 32 and a sleeve joint 33. The sleeve joint 33 is connected to a head 34 which includes a sleeve-type joint 35 which interconnects the head 34 to an elongate horizontal conveyer mechanism or discharge spout structure 36. This spout structure 36 includes a tubular housing 37 having an elongate screw type or auger conveyer 38 rotatably positioned therein, the housing 37 terminating in a discharge outlet 39. It will be noted that the sleeve joint 32 permits the horizontal auger conveyer mechanism 36 to be moved about a substantially vertical axis while the sleeve joint 33 permits the spout structure to be elevated and lowered about a substantially transverse horizontal axis. The sleeve connection 35 further permits the discharge spout structure 36 to be rotated about its longitudinal axis for adjusting the angular relation of the discharge outlet 39 if it is so desired to make such an adjustment. Thus, it will be seen that the granular material may be discharged from the feed body T for passage through the various conveyer mechanisms so that such bulk material may be selectively fed into bins, hoppers, barns or other structures.

One of the problems associated with feed bodies constructed in the manner of the elongate conventional trailer structure of the type illustrated herein is in the problems of unloading. Feed body structures of this type in most instances cannot be tilted and must be unloaded by manually shoveling the feed material from within the trailer to the exterior or the trailer structure itself must be completely reconstructed so as to have a hopper-type bottom. Other feed body structures have been provided with bulky complicated conveyer mechanisms disposed below the surface of the floor which greatly add to the weight of the feed body and are highly expensive.

I have provided means for quickly unloading conventional trailer type feed bodies and in which there is very little alteration of the existing structure of the trailer. To this end, I have provided a longitudinal recess 41 which is centrally located with respect to the bottom wall 14 and which extends throughout the length of the feed body bottom and terminates rearwardly with the feed outlet 21. An uniquely constructed conveyer mechanism 42 is disposed within the recess in the floor or bottom 14 and this conveyer mechanism includes an elongate pan structure 43 of generally channel-shape cross sectional configuration as best seen in FIG. 4. The pan structure 43 includes a web or substantially horizontally disposed bottom portion 44 having upstanding flanges or wall portions 45 extending upwardly therefrom. The upper portions of the flanges 45 are provided with substantially horizontally disposed inturned flanges 46 which as best seen in FIG. 4, are disposed in substantially co-planar relation with the upper surface of the floor 14. It will also be noted that pan structure 43 is of relatively shallow construction and does not project upwardly beyond the upper surfaces of the floor nor does it require reconstruction of the sub frame or reinforcing structure of the trailer feed body floor. Referring again to FIG. 4, it will be seen that the pan structure 43 is provided with a divider panel 47 which extends between and is secured to the upstanding flanges 45. This divider panel 47 extends substantially throughout the length of pan structure 43 as best seen in FIG. 1.

The conveyer mechanism 42 also includes an endless apron or belt type conveyer 48 which when disposed within the elongate recess 41 includes an upper run or reach 48a and a lower run or reach 48b. The forwardmost portion of the apron conveyer 48 is trained over an idler roller 49 which is suitably mounted for rotation about a substantially horizontally disposed transversely extending axle 49a. A guide roller 50 is positioned above the upper run 48a and cooperates with the divider panel 47 so that the upper run 48a is maintained in engagement with the divider panel 47.

The rearmost portion of the endless apron conveyor 48 is trained around a drive roller 51, the latter being rotatably mounted upon a drive shaft or axle 51a. It will be noted that the roller 51 is positioned within the chute 20 so that the uppermost circumferential surface of the roller is disposed slightly below the level of the receptacle floor 14. A guide roller 52 is positioned forwardly of the drive roller 51 within the discharge chute 20 and cooperates with the divider panel 47 and web portion 44 of the pan structure 43 for maintaining the lower run 48b in substantially parallel relationship with the upper run 48a. Thus, it will be seen that the upper and lower runs 48a and 48b respectively of the endless apron 48 are disposed in contacting relation with the divider panel 47 so that the entire conveyer mechanism 42 is of very shallow cross sectional configuration and, as pointed out above, may be incorporated in conventional trailers thus rendering the trailers effective for conveying and unloading bulk material without requiring extensive modification or alteration of such trailers.

An inclined guard petition 53 is provided for suitably covering the idler roller 49 and the guide roller 50 associated with the forward portion of the conveyer apron 48 while the elevator conveyer mechanism 28 is closed off from the remainder of the interior of the feed body T by means of partition walls 17a, as best seen in FIGS. 2 and 3, to thereby define a small compartment 17b. It will also be noted that the uppermost run 48a of the endless conveyer apron 48 is disposed slightly below the upper surface of the floor 14b and is disposed slightly below the upper surface of the floor 14b and is disposed below the inturned flanges 46, the latter serving to prevent granular material from escaping or accumulating at the edges of the pan structure.

Means are provided for supplying power to the drive roller 51 so that the conveyer mechanism 42 may be operated and this means includes an elongate drive shaft 53 which is interconnected at its forward end to the power take off (not shown) of the tractor 11. The rearmost end of the drive shaft 53 is interconnected through a gear reduction box 54, as best seen in FIG. 2, to an operative driving connection 55 of the chain type which inturn drivingly engages the drive roller shaft 51a, the latter being provided with a sprocket about which the drive chain 55 is trained. Drive means in the form of a drive chain 56 extends from the shaft 51 and engages a suitable sprocket affixed to the projecting shaft of the auger 24. The auger 30 of the elevator conveyer mechanism 28 and the auger 38 of the discharge spout structure 36 are sequentially drivingly interconnected by means of conventional drive transmitting mechanism with the heads 25, 31 and 34 which, per se, do not constitute part of the instant invention. Thus, further description of this structure is deemed unnecessary in the instant application.

It will, therefore, be seen that when bulk material such as grain or the like is transported in the feed body T and it is thereafter desirable to unload the feed body, the conveyer mechanism 42 is caused to be driven so that the granular material is conveyed rearwardly through the feed outlet 21 to the discharge chute 20 and thereafter into the transversely disposed conveyer mechanism 22. Since the sequentially arranged conveyer mechanism 22, 28 and 36 are preferably driven during operation of the conveyer 42, the material within the feed body will be unloaded, elevated and thereafter discharged into various kinds of receptacle structures. It will be noted that the disposition of the drive roller 51 within the discharge chute 20 permits the material to be conveyed substantially horizontally and effectively discharged into the chute 20 for subsequent discharge by the sequentially arranged auger conveyer mechanisms. The close combinative relationship between the discharge chute 20 and auger conveyer mechanism associated therewith and the apron type conveyer, not only permits rapid unloading of conventional trailer feed bodies but in no way interferes or takes away from the load capacity of the trailer. Again, it is pointed out that trailer bodies of the elongate conventional towed type may be quickly converted bulk feed bodies with a minimum of alteration to such conventional structures.

When a load of granular type material, for example, is to be unloaded the material will be shoveled or otherwise placed upon the upper run 48a of the conveyer for conveyence of the material rearwardly through the feed outlet and into the discharge chute. Since the conveyer mechanism 42 is centrally located with respect to the trailer floor and extends substantially longitudinally throughout the entire length of the trailer it is necessary for a person to shovel the granular material only a short distance upon the continuously running conveyer mechanism. Thus, it will be seen that conventional trailer structures may be effectively and efficiently used as grain transporting feed bodies even though such trailers are not provided with tilting mechanism for unloading of the granular material. It will also be seen from the preceding paragraphs that conventional trailers may be quickly and economically converted to mobile bulk feed bodies through the use of my inventive concept without in any way interfering with the load capacity of such trailers.

Thus, it will be seen from the foregoing description that I have provided an improved mobile feed body for use in carrying bulk material and the like which is not only of simple and inexpensive construction and operation but which functions more efficiently than any heretofore known comparable device.

It will, of course, be understood that various changes may be made in the form, details, arrangement and proportions of the various parts without departing from the scope of my invention.

What I claim is:

1. Mobile bulk feed body having a substantially flat horizontally disposed bottom wall and having upstanding front and rear wall portions and opposed side walls, said bottom wall having a feed outlet adjacent the rear portion and having a centrally located elongate recess extending longitudinally from adjacent the front portion of said feed outlet, the width of said recess being substantially less than the width of said bottom wall, a discharge chute connected to said bottom wall adjacent the rear portion thereof and depending therefrom and communicating with said discharge outlet, a discharge channel positioned below said chute and communicating with the interior thereof and extending transversely of said receptacle bottom wall, conveyer mechanism for conveying material within said receptacle through the feed outlet and discharge chute and into said discharge channel and including front and rear roller members, said rear roller member being positioned within said discharge chute and having its upper circumferential surface disposed below said feed outlet, a generally horizontally disposed endless conveyer apron disposed within and extending substantially throughout the longitudinal extent of said recess and being trained about said roller members to extend through said feed outlet into said discharge chute, said conveyer apron including upper and lower runs disposed in close proximity to each other with the upper runs being positioned slightly below the upper surface of the bottom wall, and extending downwardly through said feed outlet into said chute, said rear roller member being adapted to be connected to a source of power for rotation thereof driving the endless apron conveyer in a direction to move said upper run rearwardly towards said feed outlet.

2. The structure as defined in claim 1 and a transversely disposed conveyer mechanism positioned within said discharge channel for conveying material laterally thereof, and an elevator mechanism operatively connected to said discharge channel and having an elongate adjustable discharge spout for discharging material therefrom whereby material fed into said discharge channel may be elevated and thereafter discharge through said discharge spout.

3. The structure as defined in claim 1 and a pair of guide roller means each being positioned in close proximity to one of said front and rear roller members and cooperating therewith for maintaining said endless conveyer apron in substantially horizontally disposed relation.

4. The structure as defined in claim 1 and an elongate shallow pan structure of substantially channel-shaped cross sectional configuration positioned within said recess for receiving and supporting said conveyer apron therein, said pan structure having a bottom portion and an upstanding opposed wall portion extending upwardly therefrom, and an elongated substantially flat divider panel extending between and connected to opposing wall portions of said pan structure and serving to separate the upper and lower runs of said endless apron conveyer.

References Cited in the file of this patent
UNITED STATES PATENTS

| | | |
|---|---|---|
| 2,353,948 | Swift | July 18, 1944 |
| 2,507,252 | Hoover | May 9, 1950 |
| 2,676,002 | Wolfe | Apr. 20, 1954 |
| 2,770,377 | McCallum | Nov. 13, 1956 |
| 2,883,076 | Palmer | Apr. 21, 1959 |